United States Patent [19]

Peil

[11] 4,031,416

[45] June 21, 1977

[54] SEMICONDUCTOR AMPLIFICATION MEANS COMBINING TWO CASCADED TRANSISTOR AMPLIFIERS OF HIGH INVERSE IMPEDANCES

[75] Inventor: William Peil, North Syracuse, N.Y.

[73] Assignee: General Electric Company, Syracuse, N.Y.

[22] Filed: Mar. 8, 1976

[21] Appl. No.: 664,509

[52] U.S. Cl. .......................... 307/299 A; 307/303; 307/315; 357/36; 357/46; 330/28

[51] Int. Cl.$^2$ ........................................ H03K 3/26

[58] Field of Search ............. 307/315, 254, 299 A, 307/237, 303; 358/21; 357/36, 46; 330/28

[56] References Cited

UNITED STATES PATENTS

| | | | |
|---|---|---|---|
| 2,864,904 | 12/1958 | Jensen | 307/303 |
| 3,233,125 | 2/1966 | Buie | 357/46 |
| 3,913,213 | 10/1975 | Mills et al. | 357/46 |
| 3,971,961 | 7/1976 | Inami et al. | 307/315 |

*Primary Examiner*—John Zazworsky
*Assistant Examiner*—Marcus S. Rasco

*Attorney, Agent, or Firm*—Richard V. Lang; Carl W. Baker; Frank L. Neuhauser

[57] ABSTRACT

The present invention relates to semiconductor amplification means, which may be fabricated as a monolithic semiconductor structure, for use in an automatic gray scale control circuit for a color television receiver. During the blanking interval, the control circuit senses the cut-off voltage of each gun of a three gun color cathode ray tube and stores that voltage. During the video field, the stored voltage is used to energize the driver for the individual gun and to bias that gun. The AGS control function for each gun requires two amplifiers of high current gain, high inverse impedance, only one of which is on at a time, and a consolidation of the sensing and output functions in two terminals. These functions are achieved in a four transistor configuration in which two cascaded pairs of emitter follower transistor amplifiers are connected in a closed loop. A high inverse impedance is achieved by the provision of a second emitter in the output transistor of each cascaded pair, coupled to the base of the preceding transistor to insure turn off.

6 Claims, 6 Drawing Figures

SEMICONDUCTOR AMPLIFICATION MEANS COMBINING TWO CASCADED TRANSISTOR AMPLIFIERS OF HIGH INVERSE IMPEDANCES

The automatic gray scale control circuit is the subject of a separate application of Y. C. Hwang, William Peil and John F. Zeigler, filed simultaneously herewith on Mar. 8, 1976, Ser. No. 664,554, and entitled "Automatic Gray Scale Control Circuit for a Color Television Receiver".

BACKGROUND OF THE INVENTION

1. Field of the Invention

The present invention relates to the field of semiconductor amplifiers and in particular to an amplifier configuration in which a pair of cascaded amplifiers are required to operate in alternation, and to achieve high current gain when "on" and high inverse current when "off". The application of the present amplifier is to an automatic gray scale control circuit for a color television receiver.

The invention also relates to the field of semiconductor fabrication, and more particularly to a monolithic semiconductor structure suitable for moderately high voltage applications.

2. Description of the Prior Art

The advent of integrated circuits has given the designer a powerful tool in assembling collections of transistors. However, the technology as it is practical today is economically feasible only at low voltages and with small power dissipations. Thus, for high voltage applications, one is forced to use fabrication techniques suitable for individual transistors. In the event that multiple transistor functions are desired, it may often be economical to form unitary assemblies of a relatively small number of transistors. One such assembly is disclosed in U.S. Pat. No. 2,663,806 to Darlington, entitled "Semiconductor Signal Translating Device".

The Darlington patent cited above describes a two or three transistor structure wherein successive transistors are connected in cascade. Cascading is required in the present application to achieve adequate gain and two alternately active cascaded amplifiers are required. In addition, the control application herein contemplated makes it desirable that the input and output functions share common terminals and that a given cascaded amplifier pair be characterized by a high inverse impedance when in the "off" state.

The contemplated application is to an automatic gray scale control circuit for a color television receiver. In the foregoing application the voltages to which the transistors are exposed are on the order of two hundred volts, and the leakage currents when a cascaded amplifier is turned off should be substantially less than the functional microampere currents of the cathode ray tube, when it is self-biased to cut-off. In this application, the function of the semiconductor amplification means is to sense the voltage at the cathode of a gun of a color cathode ray tube, when it is cut off during blanking and charge a capacitor to that voltage. During the video field, the driver and cathode are supplied current at the same terminal used for sensing the gain cut off potential at the voltage stored on the capacitor.

SUMMARY OF THE INVENTION

Accordingly, it is an object of the present invention to provide novel amplification means for control of the gray scale of a color television receiver.

It is a further object of the present invention to provide a novel cascaded transistor amplifier which is characterized by a high inverse impedance when turned off.

It is another object of the present invention to provide a novel amplification means comprising two cascaded amplifiers which are alternately active, and which are characterized by high inverse impedances when turned off.

It is a further object of the present invention to provide a novel amplification means comprising two cascaded amplifiers which are alternately active, and in which the control terminals are used for both input and output functions.

It is an additional object of the present invention to provide a monolithic semiconductor structure suitable for moderately high voltage applications combining two cascaded amplifiers, which are alternately active and which are characterized by high inverse impedances when turned off.

These and other aspects of the invention are achieved in a novel semiconductor amplification means which comprises four transistors of like conductivity type. The four transistors are interconnected with the emitter of the first transistor (Q1) coupled to the base of the second transistor (Q2). The transistor Q2 has a first and a second emitter with the first emitter Q2 being coupled to the base of the third transistor Q3 and the second emitter of Q2 being coupled to the base of Q1. This provision is to insure turn off of Q2 when Q1 is turned off. The emitter of Q3 is coupled to the base of the fourth transistor (Q4). The transistor Q4 has a first and a second emitter, with the first emitter of Q4 being coupled to the base of Q1, and the second emitter of Q4 being coupled to the base of Q3 to insure turn off of Q4 when Q3 is turned off. A first terminal coupled to the collectors of Q1, Q2, Q3, Q4 is provided for connection to a d.c. source.

In addition, a pair of control terminals are provided coupled respectively to the base of Q1 and to the base of Q3 for causing Q1, Q2 to conduct current from said source to one control terminal and Q3, Q4 to be nonconductive at a low leakage current in response to control signals of one polarity, and for causing Q1, Q2 to be nonconductive at a low leakage current and Q3, Q4 to conduct current from said source to the other control terminal in response to control signals of opposite polarity.

In accordance with a further aspect of the invention, the novel semiconductor amplification means are fabricated in a monolithic structure. A semiconductor substrate having a first region of a first conductivity type forms a common collector region for all the transistors. Separate diffusions of a complementary conductivity type in the first region form bases, and separate diffusions of said first conductivity type in said base diffusions form the emitters. In Q1 and Q3 one emitter diffusion is formed in the base region, while the base regions of Q2 and Q4 two emitter diffusions are formed. Preferably, the first collector region is an epitaxial layer on the semiconductor substrate. The emitter base connections are achieved by a four part metallization. The control terminals are coupled respectively to the metallization interconnecting the base of Q1, the second emitter of Q2 and the first emitter of Q4 and to the metallization interconnecting the first emitter of Q2, the base of Q3 and the second emitter of Q4.

BRIEF DESCRIPTION OF THE DRAWING

The novel and distinctive features of the invention are set forth in the claims appended to the present application. The invention itself, however, together with further objects and advantages thereof may best be understood by reference to the following description and accompanying drawings in which:

DESCRIPTION OF PREFERRED EMBODIMENTS

Figure 1:
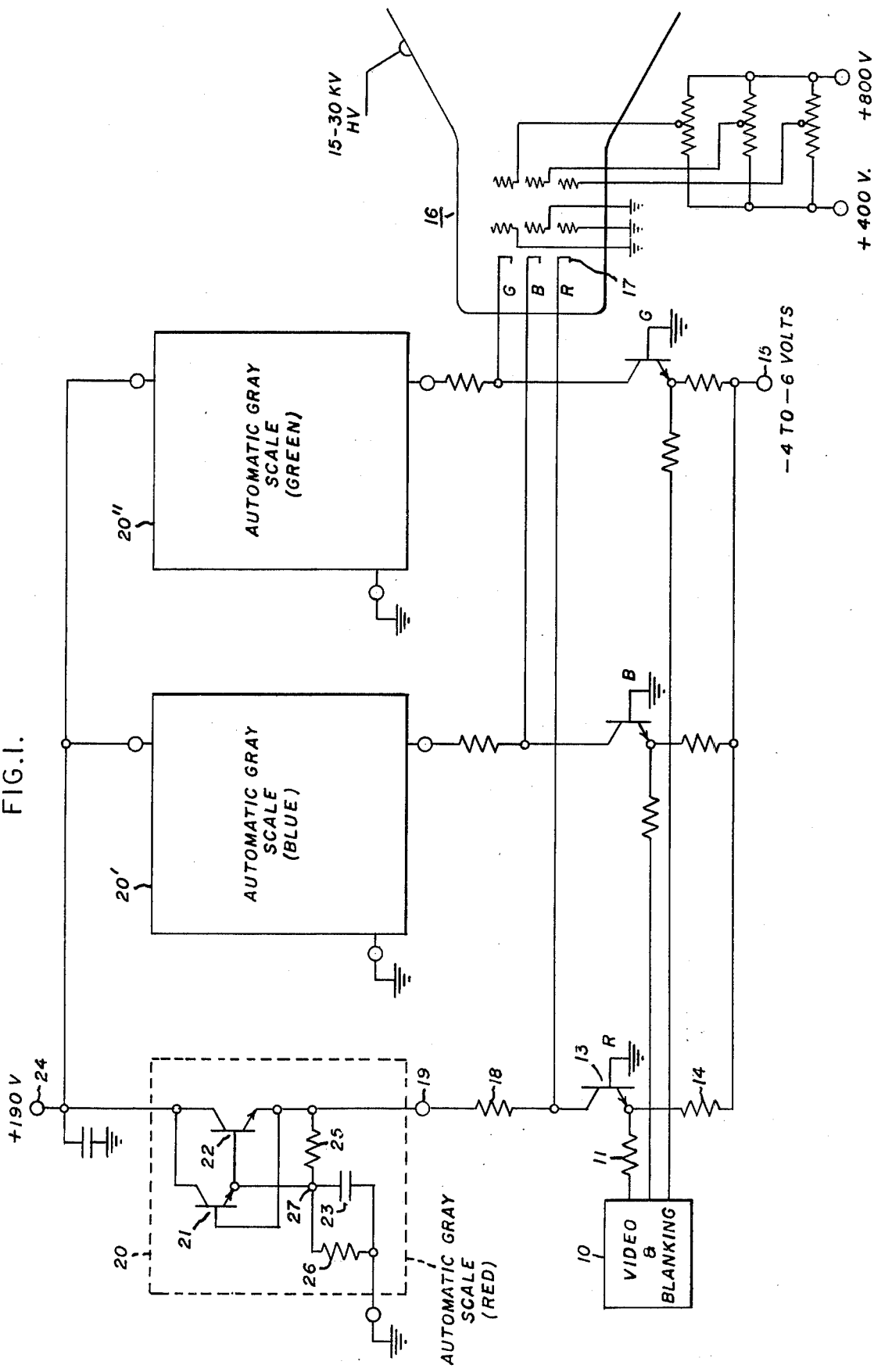
FIG. 1 is a simplified circuit diagram of a novel automatic gray scale control circuit for a color television receiver illustrated in association with a three gun cathode ray tube.

FIG. 1 shows a simplified electrical circuit diagram of the automatic gray scale control circuit for a three gun color cathode ray tube. The circuit has been simplified for purposes of explanation, including the omission of the circuitry associated with the other two guns.

The source of video signals and driver circuit for the CRT are conventional. A source of video signals 10, typically consisting of the video detector, following video amplifiers and blanking circuitry of a television receiver, couples a video signal through a series resistor 11 to the emitter of transistor 13 which drives one gun of the CRT 16. As shown by the waveform 12 of FIG. 2, the video portion of the signal is interspersed between blanking pulses. The video signal is of inverted polarity with the brightest portions of the video signal most negative and the darkest portion less negative. The blanking pulses which are for both vertical and horizontal retrace intervals, normally go positive (or darker than dark) to the point where they are capable of cutting off the driver stage. The driver transistor 13 has its emitter coupled through resistor 14 to a negative potential at terminal 15 and its base grounded. The collector of the transistor 13 is connected to the cathode 17 of one CRT gun and to one terminal of the load resistor 18. The other terminal of the load resistor is coupled to the output terminal 19 of the automatic gray scale control circuit 20. The AGS (automatic gray scale) control circuits are shown within the rectangular outlines (20, 20', 20''). Each is a three terminal network whose two other terminals are coupled to a source 24 of positive potentials and to ground, respectively. As will be explained the AGS control circuit energizes the driver circuitry and provides a controlled voltage to the CRT gun for automatic control of the gray scale. The driver transistor 13 is biased to provide linear signal amplification during the negative video portion of the signal and to be cut off during the positive blanking pulse intervals. The driver output signal appears as a voltage across load resistor 18, the impedance of the AGS control circuit being small. The connection of the load resistance to the cathode 17 couples the driver output to the red CRT gun.

The color CRT 16 has three similar guns which produce three focused beams. These three beams are modulated by the video signal, scanned by the deflection means, and impinge on the phosphors on the face plate creating the video picture. Each gun consists of a cathode, a signal grid, and a screen grid. The anode, which is in the vicinity of the face plate of the tube, and the deflection circuitry have been omitted for simplicity. The CRT 16 operates with three video drivers, each coupled to one of the cathodes, with the three signal grids grounded, and the screen grid provided with a 400 to 800 volt positive potential. In a conventional circuit, the screens are coupled to individual potentiometers for individual voltage adjustment but in the present embodiment a fixed setting for each screen is all that is required. The anode potential is normally from 15 to 30 KV.

The driver circuitry is designed to operate the CRT without a separate blanking circuit. During the video portion of the signal the individual beams are modulated in accordance with the driver output. During blanking periods, when the driver transistors are cut off, the driver circuit is designed in accordance with the invention to provide a virtual open circuit to the cathode, allowing the CRT to self-bias itself quickly to successively more positive potentials until it cuts itself off. The beam current at self-biased cut-off is normally on the order of a quarter microampere. In practice, the driver transistor has too much leakage current to allow the CRT to reach cut-off potential at the desired low currents, so one must introduce a blocking diode into the output as shown in the complete circuit diagram of FIG. 3.

The three gun, color CRT, which is illustrated at 16, is manufactured with conventional tolerances and requires gray scale adjustment of each gun to compensate for differences between the individual guns. In the television tube, each gun is designed to produce a beam impinging on the phosphor of an assigned primary color. The phosphor, which creates the color image in response to beam impingement, is patterned to produce triads of three primary colors for each picture element. The eye views each triad as having a hue determined by the total light produced by the three components of the triad. If the red gun is producing the only emission of the three guns, the red phosphors in the triad will produce the light, and the picture element will appear to be red. If the three guns have equal emissions or more accurately, emissions which produce equal amounts of light of the primary colors from the phosphors, then the picture element will appear to be without hue. When the three gun emissions are large and equal and phosphor efficiencies equal, the picture element appears white. When the three gun emissions are very small and equal and phosphor efficiencies equal, the picture element appears black. At intermediate levels, the picture element appears to be gray. A hueless rendering of hueless picture content from dark to bright is defined as maintaining a constant gray scale.

Manufacturing error and the CRT aging process force the use of compensating circuits for maintaining an accurate, hueless rendering of the gray scale. Since both manufacturing tolerances and aging are involved, conventional CRT operating circuitry is designed for adjustment both during manufacture and after delivery to the user. Empirically, two independent variables govern the emissions of each gun — the gain and the "cut-off" voltage. The cut-off voltage is defined by a test in which the beam current is reduced to within the range of from 0.1 microampere to 1 microampere, at which there is no observable phosphor emission under prescribed external lighting conditions. The design values for each gun take into account the corresponding phosphor efficiencies and yet depend on an arbitrary selection of the threshold of phosphor emission.

The manufacturing error in gain ($g_m$) of the CRT is normally compensated for by the adjustment of the driver gain and the manufacturing error in the cut-off voltage is normally compensated for by the adjustment of the accelerating grid voltage. The aging process affects the gain somewhat, but to a lesser degree than the cut-off potential. While aging introduces no new variables, it does force the manufacturer to deliver the TV receiver with adjustment means that can be used throughout the operating life of the television receiver. The gain and cut-off adjustments are separate, and customarily provided by means of five potentiometers. Three provide the individual cut-off adjustments and two provide individual gain adjustments.

In spite of the possible independence of these five variables and the provision of separate controls for each variable, alignment is customarily a difficult process. The alignment process depends on the operator judgment of color. Since color is a function of both independent variables, the two adjustments (for each gun) are interactive. If the picture is too red at the viewing level selected, the operator is uncertain as to whether it is because of too much gain for the red gun or too high a cut-off current setting for the red gun. If a lower viewing intensity is selected, the observer may have less difficulty determining the proportion of red to the other colors, but until cut-off is reached, and the red output zeroed and thus not observable, both variables contribute to the red output. Thus, the "color set up" is a complicated iterative procedure at the factory and difficult to reproduce once the receivers are in service.

In accordance with the present invention, the need for operator adjustment of the cut-off voltages is eliminated by the provision of the circuit (20, 20', 20'') for automatic correction of the cut-off potential of each gun. With the manual cut-off adjustments eliminated, only gain adjustments are left to affect the gray scale, avoiding the interaction between cut-off and gain that complicate the conventional color set up process. As will now be explained, a simplification in both the circuit and the alignment process has been achieved.

The novel automatic gray scale control circuit 20 permits the individual guns to go to self-biased cut-off during blanking at an arbitrarily small current. Actuated in response to this small current, a capacitor is charged to a voltage equal to the cut-off voltage of each gun. During video, the stored voltage is used to provide bias for the driver for each cathode. When each of the three cathodes are biased to their respective cut-off voltages, dependence of the emission on the cut-off voltage is eliminated and the gray scale now becomes dependent only on the gain of each gun. Assuming a proper gain setting, gray scale will be properly reproduced. Since the gain adjustment changes less with time than the cut-off adjustment, now automatically maintained, in service adjustments are both simpler and less frequent. The means by which automatic gray scale correction is performed will now be described.

The automatic gray scale control circuit 20 energizes the drive circuit and provides a bias voltage for the gun of the CRT equal to cut-off voltage. In other words, it resets the gun to zero emission for zero video signal. The output waveform is shown at 27 in FIG. 2. The automatic gray scale circuit consists of two transistor amplifiers 21 and 22 and a storage capacitor 23. The first transistor amplifier 21 senses the cathode current of the CRT at cut-off and charges the capacitor 23 approximately to the CRT cut-off voltage. The second transistor amplifier 22 biases the CRT driver load circuit to the voltage previously stored on the capacitor 23. The transistor amplifier 21 which actuates the charging circuit is turned on during the blanking portion of the signal, when the CRT self-biases itself to cut-off. The transistor amplifier 22 which controls the application of bias to the CRT cathode is turned on during the video portion of the signal, when the CRT is producing a picture. By energizing the driver at a voltage automatically set to the gun cut-off voltage, the emission of each gun is standardized and assuming proper gain settings, the gray scale of the CRT adjusted to the correct value.

The connections of the automatic gray scale control circuit which performs this function are as follows: The amplifiers 21, 22 are symbolized as single NPN transistors in emitter follower configuration. In practice, each amplifier may consist of a Darlington pair and a leakage current reducing diode. The output emitter of the transistor amplifier 21 is coupled to the input base of transistor amplifier 22 and the output emitter of transistor amplifier 22 is coupled to the input base of transistor 21. This connection insures the one and only one transistor is conductive at a time. The input base of transistor amplifier 21 and the output emitter of transistor amplifier 22 are coupled to the output terminal 19 of the AGS control circuit to which driver load resistance 18 is connected. The emitter of transistor amplifier 21 and the base of transistor amplifier 22 are coupled to one terminal of storage capacitor 23, the other terminal of which is grounded. The collector of both transistor amplifiers are coupled to the terminal 24 providing 190V positive d.c. potentials. This permits the cathode driver potential to be adjusted up to a maximum positive value of +190 volts. A current sensing resistor 25 having a large resistance value (e.g. 10 megohms) is coupled across the input junction of transistors 21 and 22 to control their conductive states. A second resistance 26 is provided in shunt with the storage capacitor 23.

The sensing and storing of the cathode voltage of the CRT, when it is self-biased to cut-off, is performed during the vertical blanking pulse by the transistor 21 in association with capacitor 23 and resistors 25 and 26.

When the driver 13 is cut-off by the blanking pulse and completely open circuited, all the current from the CRT cathode flows into the terminal 19 of the AGS control circuit. This current flow elevates the cathode voltage from a lower value resulting from discharging current during the video field time to a higher positive value set by CRT self-biasing action. (This is illustrated in the waveform 27 of FIG. 2.) The CRT cathode voltage may be regarded as being developed across the parasitic capacitance of the cathode 16 to ground, and the CRT current path includes the parasitic input resistances of the amplifiers 21, 22 as well as the shunting resistance 25. The impedance of this current path is controlled by the resistance 25 at a value near ten megohms. At the moment before the CRT self-biasing action starts, the emitter of amplifier 21, as a result of current drain on capacitor 23 by the base current of amplifier 22 and leakage by shunt resistor 26, is slightly (approximately 2 volts) below that at the beginning of the field. As the CRT self-biasing action starts, the voltage rise in resistance 25 quickly exceeds the input junction drop of the transistor amplifier 21 (0.5 to 1.0 volts), turning it on. When transistor amplifier 21 turns on, emitter follower action ensues and capacitor 23 charges from the d.c. source of terminal 24. The capacitor voltage during charging is lower than the voltage of the CRT cathode by the voltage drop from base to emitter of amplifier 21. Meanwhile, the voltage across resistance 25 and the input junctions of amplifiers 21 and 22 is of a polarity to turn the transistor amplifier 22 off.

The cut-off voltage which the CRT finally reaches by self-biasing action, is determined by resistance 25 and capacitor 23. External to the CRT, the current flows partly through resistance 25 and partly through the transistor 21. The greatly amplified charging current raises the voltage on capacitor 23 and in turn the voltage on the cathode of the CRT rises in respect to the signal grid held at ground potential. Within the CRT, an increasing reverse bias between cathode and signal grid reduces the CRT current. As the cathode current decreases to a point that the transistor 21 is barely turned on, the charging current is drastically diminished. These counteracting effects produce an equilibrium condition at a specified current and voltage which is approached at a prescribed rate. If the resistance 25 is increased, the equilibrium approaches a lower current (i.e., 1.0 microampere) and lower voltage equilibrium is approached. The time constant of the capacitor charging circuit is normally set too large to permit an equilibrium during the horizontal blanking, but is small enough to permit an approximate equilibrium during vertical blanking.

During CRT cut-off, amplifier 21 continues to remain on and amplifier 22 continues to remain off. When blanking ends and the video portion of the signal commences, the driver transistor 13 is turned on and the second phase of AGS control circuit operation ensues.

At the start of the video signal, conduction by the driver transistor 13 immediately discharges the cathode parasitic capacitance. The cathode voltage falls to a potential potential which the transistor amplifier 22 turns on. This point occurs at the moment that the potential at terminal 19 has fallen sufficiently below the voltage stored on capacitor 23 to forward bias the transistor amplifier 22. This voltage difference is now one (or two) input junction drops below the potential on capacitor 23, and it represents a net change of from two (to four) diode drops below the value on terminal 18 during cut-off a moment earlier. This drop is insignificant in terms of the absolute voltages involved, and of no consequence, since it is a constant offset repeated for each video line segment. At the instant that transistor amplifier 22 is turned on, the transistor amplifier 21 is turned off, and the charging process on capacitor 23 terminated. Under these new conditions, the voltage on AGS control circuit output terminal 19 is held equal to that stored on the capacitor 23 (less the input junction drops). The capacitor 23 is selected to have a sufficiently high capacity to store adequate charge to supply current to the transistor amplifier 22 between vertical blanking pulses with a negligible droop in bias potential. The current demand of transistor amplifier 22 can be made quite small in a Darlington configuration, permitting the capacitor to be a few (two) microfarads.

Figure 2:
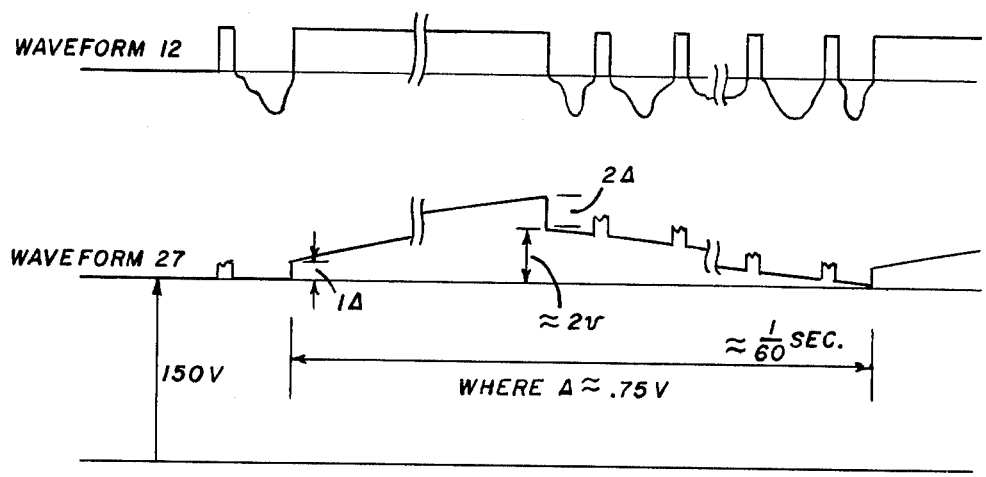
FIG. 2 consists of two waveforms illustrating, respectively, the video signal with blanking pulses as applied to the input of one video driver, and the output of the automatic gray scale control circuit.

The waveform 27 of FIG. 2 illustrates the voltage on terminal 19 of the AGS control circuit. At the start of each vertical blanking interval, there is an upward step of about 0.75 volts (for the FIG. 3 embodiment), followed by a gradual rise in potential as the self-biasing action of the cathode ray tube drives the tube toward cut-off. At the same time, the capacitor 23 is charged to a value approaching the CRT cut-off value, less the junction drops of amplifier 21. At the instant that vertical blanking terminates, the waveform at 19 steps downwardly (approximately 1.5 volts in the FIG. 3 embodiment) to a new value higher than the voltage at the start of vertical blanking. The upward voltage correction during vertical blanking is superimposed on a pedestal having a value in the range of from 50 to 190 volts. The voltage then droops through the video field until the next vertical blanking interval. A small upward and small downward step occurs at each horizontal blanking interval superimposed on the approximately 150 volt pedestal. The upward and downward steps during horizontal blanking are substantially equal and thus produce no substantial correction to the droop which exists through the video field. The upward correction during vertical blanking is approximately 2 volts on a typically 150 volt pedestal and matches an equal downward droop during the video field.

The switching transients which appear during horizontal and vertical intervals are normally off the picture and thus not seen on the cathode ray tube. Nevertheless, it is desirable to provide filtering at the terminal 24 to preclude rectification of the transients in the amplifier 21 via the collector to base capacity. The filtering capacity may be on the order of 0.01 microfarads.

Figure 3:
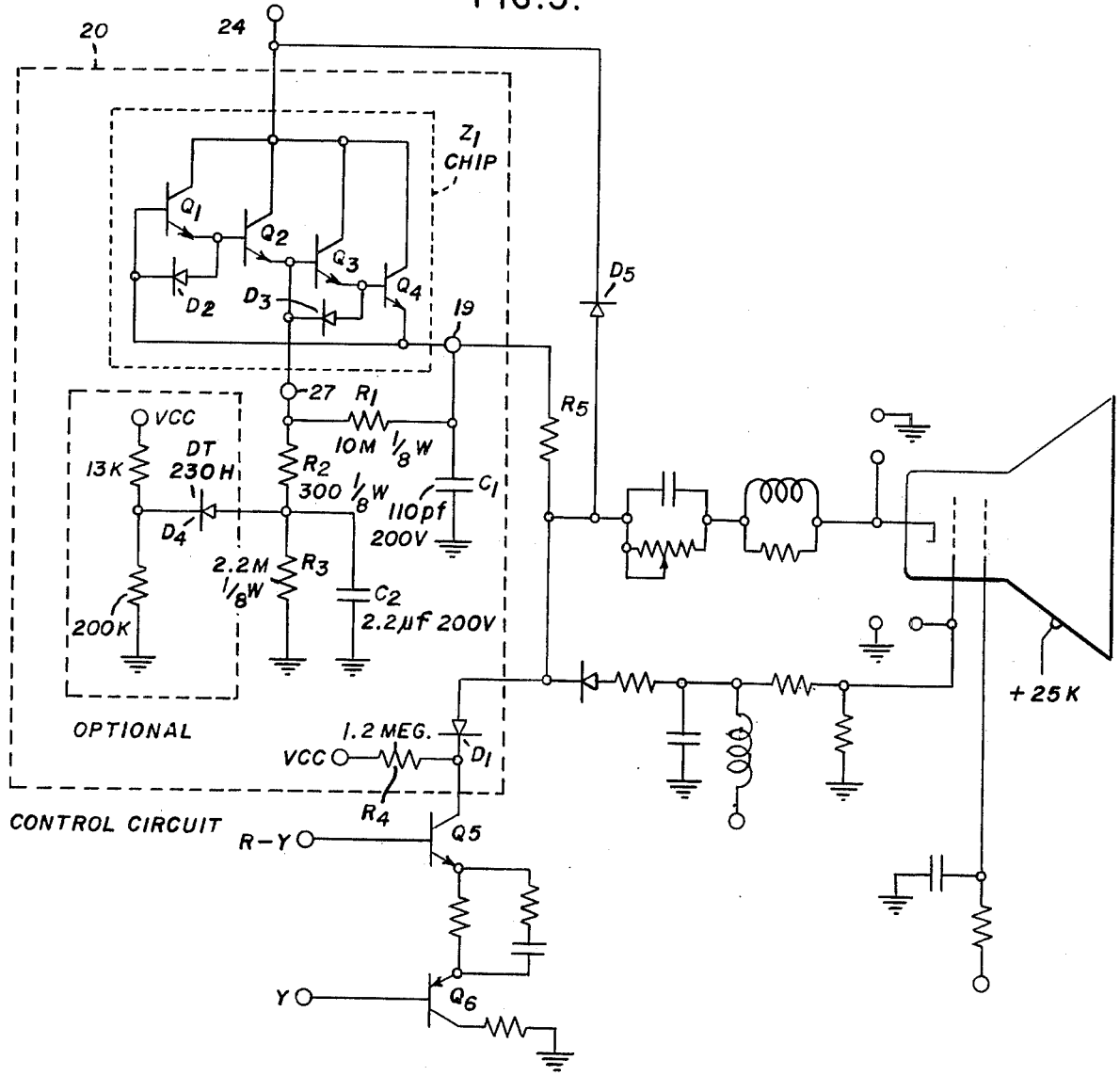
FIG. 3 is a detailed circuit diagram of the automatic gray scale control circuit for one gun of a three gun cathode ray tube.

A complete circuit diagram of the AGS control circuit and driver circuit of a single gun is shown in FIG. 3. Circuit values have been indicated for the principal components. The circuit for each of the three guns repeats all of the indicated circuitry except for the driver transistor Q6 to which the luminance (Y) signal is applied. The transistor Q6 is common to the driver circuit for each gun.

The heart of the AGS control circuit is the chip Z1, which consists of four transistors Q1, Q2, Q3 and Q4 and a pair of diodes D2 and D3. The first pair of transistors Q1 and Q2 are in emitter follower configuration and connected in cascade to perform the functions of the transistor amplifer 21 of FIG. 1. The second pair of transistors Q3 and Q4 are also in emitter follower configuration, and are connected in cascade to peform the function of the transistor amplifier 22. Since the output emitter of the first transistor pair is coupled to the input base of the second transistor pair, all four emitter followers are connected in cascade. Since the output emitter of the second transistor pair is connected to the input base of the first emitter pair all four emitter followers are connected in a closed loop.

The closed loop permits consolidation of the connections for voltage sensing and for current supply. The first control terminal 19 is coupled to the interconnection of the emitter of Q4, and the base of Q1, and the second control terminal 27 is coupled to the interconnection of the emitter of Q2 and the base of Q3. The application of a control potential between the terminals 19, 27 which is more negative on terminal 19, turns on the transistors Q3 and Q4 and turns off the transistors Q1 and Q2. Conversely, a control potential which is more negative on terminal 27 turns on the transistors Q1 and Q2, and turns off the transistors Q3 and Q4. At the time that Q3 and Q4 are turned on, the control terminal 19 becomes an output terminal, capable of supplying emitter current from Q4 to a load. In other words, terminal 19, which is used to sense the CRT cut-off voltage during blanking, is used during video to supply current to the driver and cathode. At the time that Q1 and Q2 are turned on, the control terminal 27 becomes an output terminal capable of supplying emitter current from Q2 to a load. In other words, terminal 27, which is used to sense capacitor charge during video, is used to supply current to the capacitor during blanking. Thus, the two control terminals 19 and 27 perform both sensing and output functions.

A second property of the closed loop, is that when one transistor pair is turned on, the interconnections force the other pair off and insure that only one pair will be conductive at a time. Assuming that Q3 and Q4 are conductive, the reverse bias of two junction drops (Q3 and Q4) is applied to the two serially connected input junctions of Q1 and Q2, insuring their turn off. Similarly, conduction by Q1 and Q2 insures the turn off of Q3 and Q4.

The diodes D2 and D3, which may take several practical forms, insure that when either cascaded pair is turned off, that the output transistors Q2, Q4 are in a low leakage, high impedance state. The diode D2 prevents the leakage in Q2 from charging the capacitor C2 (23, FIG. 1) when current is being drawn through Q4 during video. The D2 connection to Q2 prevents leakage current by two mechanisms. The diode connection applies at least one junction drop of backward bias to Q2 (Q4 + Q3 − D2) when Q4 and Q3 are conducting through the loop interconnection of the four transistors. In addition, any leakage current from Q1 coupled to the base of Q2 where it might be amplified by Q2, is drawn away by the diode D2. D2 draws off this current because it is coupled to a potential more favorable to conduction than the emitter of Q2. In a similar manner, when Q3 is cut off during blanking, the diode D3 prevents the leakage in Q4 from charging up the capacitor C1 or affecting the potential that the CRT reaches as it self-biases itself to cut-off. The D3 connection applies at least one junction drop of backward bias to Q4 (Q1 + Q2 − D3) and provides an alternate current path for leakage current from Q3 preventing its injection into the base of Q4.

The $h_{FE}$ gain required of Q1 and Q2 for 0.25 microampere cut-off current at an average AGS output voltage of 150 volts at 10 milliamperes is 6000, while the $h_{FE}$ gain required of Q3 and Q4 is 2000. At an 0.50 microampere cut-off current, the gain requirement of Q1 and Q2 falls to 2000. The selection of amplifiers both for charging and for discharging the storage capacitor (C2 — FIG. 3) tends to optimize the circuit with a minimum of storage capacity (~2 microfarads). One may replace either Darlington amplifier with a diode (of unity gain) or a single stage of transistor amplification of intermediate gain or a combination thereof with penalties in capacitor size The diode D1 and resistor R4 are introduced to prevent the leakage current of Q5 during vertical blanking from impairing the control action. As soon as Q5 or Q6 is cut off, D1 is reverse biased by the difference of the voltage $V_{cc}$(+100) at the terminal to which R4 is connected and the voltage on the terminal (3) to which the anode of D1 is coupled through the driver load resistance (10K). The transient current through R4, D1 and C1 (the parasitic cathode capacity), is also in the right direction to speed up the sensing operation.

The time constant of the capacitor circuit is about 4 seconds and R3 is made small enough to swamp out (10 times greater) the leakage of the chip. Practical values of C2 and R3 are 2 microfarads and 2 megohms, respectively.

The diode D4 and resistors R5 and R6 are optional. Their function is to prevent voltage at (2) from rising too close to the supply voltage $V_{cc}$. In normal operation, with a supply voltage of 190 volts, the output voltage of the AGS control circuit at (2) varies between 50 and 190 volts. If the AGS voltage rises too high, it may cause excessive leakage current and lock up the control action. This, however, will never occur in normal operation operation as long as screen voltage and $V_{cc}$ are present and properly chosen.

The resistor R2 is used to limit the surging current in Q2, particularly when the voltage $V_{cc}$ is starting from ground.

The capacitor C1 is at the terminal 19 of its automatic gray scale control circuit. It should have a value of about 100 picofarads. Its function is to reduce the transients produced by the switching of the video driver, and its isolating diode (D1).

Depending upon the limitations of the color cathode ray tube, the automatic gray scale control circuit of FIG. 3 may be used as a partial or as a complete solution to the gray scale problem. In the FIG. 3 embodiment, it is contemplated that the individual cathodes be coupled to the AGS control circuit, that the individual signal grids be separately connected to an an external ground through a low impedance (<1000 ohms), and that a rough control on the cut-off voltages of the individual guns be achieved through individual connections of the accelerating grid to a selected potential lying within the range of 300 – 600 volts. The potential selection for the accelerating grid should take into account the phosphor efficiencies for a given CRT and need not be made adjustable. The current setting at "cut-off" of the AGS control circuit is controlled by resistance R1 (10 megohms) and it may be the same for each of the three guns. The control range of the automatic gray scale control circuit is adequate to take into account relatively large (±70 volt signal grid to cathode; ±200 volts screen grid to ground) errors, and thus normally avoids the need for any other cut-off voltage adjustment. In the event that the gains of the individual guns of the cathode ray tube differ substantially, the automatic gray scale circuit must be supplemented by a pair of gain adjusting potentiometers. They are normally placed in the load circuit (R5) of two of the three drivers. With less substantial variations in gain in the individual guns, the present circuit may avoid the color set up procedure altogether and eliminate all five potentiometers. The built-in accuracy in gray scale of the present circuit arises because the gun emissions are standardized at the lowest emission levels (e.g. cut-off). where the eye is relatively sensitive to error in hue, while letting the greatest error occur at higher emission levels, where the eye is relatively insensitive to errors in hue.

Figure 4:
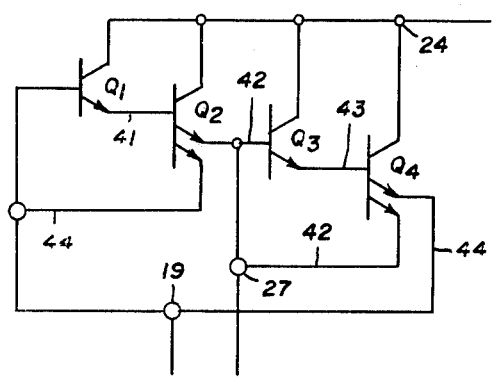
FIG. 4 is an electrical circuit diagram of a chip useful in the automatic gray scale control circuit.
Figure 5A:
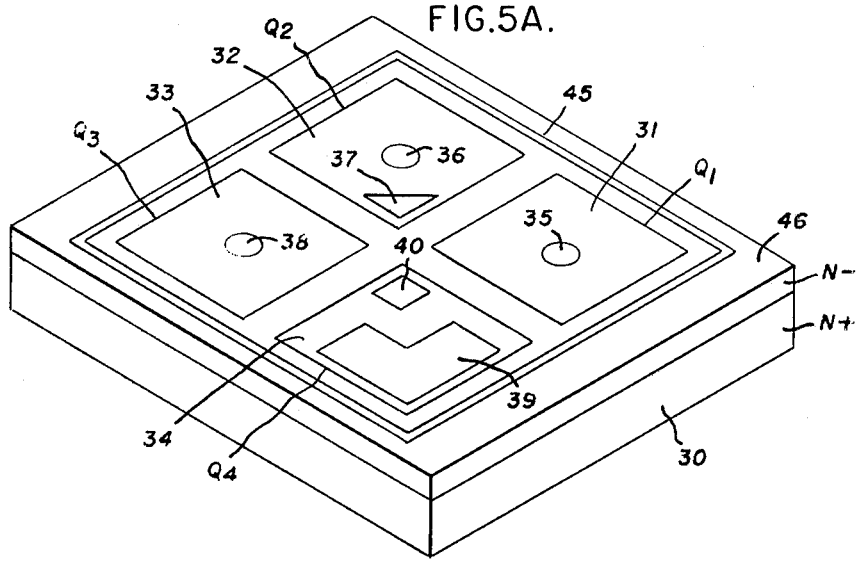
FIG. 5A and 5B are, respectively, perspective and plane views of the physical layout of the chip.
Figure 5B:
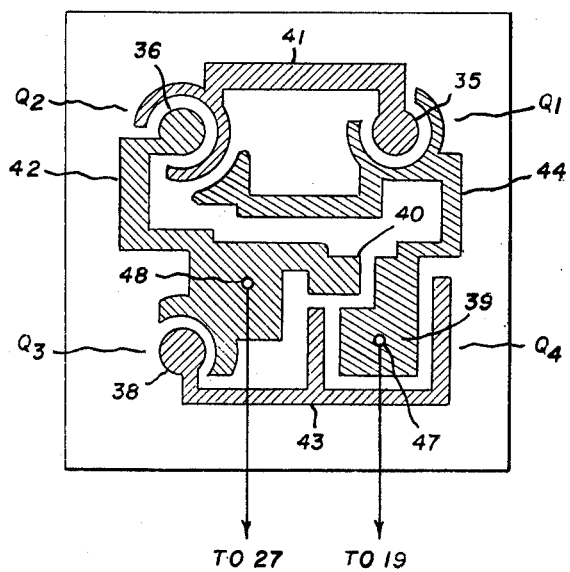

The chip Z1 which has been illustrated in the electrical circuit diagram in FIG. 3 is shown more exactly in FIGS. 4 and 5A and 5B. In FIG. 4 particularly, the chip is shown to comprise four transistors (Q1, Q2, Q3, Q4) and diodes D2 and D3 are omitted. Instead of the two diodes, Q2 is provided with both a first and a second emitter and Q4 is providied with both a first and a second emitter. The additional emitters serve to insure that Q2 is turned off when Q1 is turned off; and that Q4 is turned off when Q3 is turned off in the same manner as the diodes D2 and D3.

The interconnections on the chip are as follows: The emitter of Q1 is coupled to the base of Q2; the first emitter of Q2 is coupled to the base of Q3; the emitter of Q3 is coupled to the base of Q4; and the first emitter of Q4 is coupled to the base of Q1. In addition, the second emitter of Q2 is coupled to the base of Q1 and the second emitter of Q4 is coupled to the base of Q3. The collectors of Q1, Q2, Q3 and Q4 are all led to the common terminal 24 which is coupled to the source of collector potentials ($V_{cc}$). Neglecting the second emitter connections, the control terminal (19) is coupled to the base of Q1 and emitter of Q4. The control terminal 27 is coupled to the base of Q3 and to the emitter of Q2. As previously noted, if the potentials between these terminals is such as to turn Q1, Q2 off and Q3, Q4 on, then current will flow from the source ($V_{cc}$) through Q4 and appear at terminal 19. If the potentials between the control terminals is such as to turn Q1, Q2 on and Q3, Q4 off, then current will flow from the source ($V_{cc}$) through Q2 and appear at the terminal 27.

The monolithic physical structure of the chip is shown in FIGS. 5A and 5B. FIG. 5A, drawn in perspective, emphasizes the separate semiconductor regions and their doping, while FIG. 5B, shown in plan view, illustrates the surface metallization. The substrate 30 is of N+ type material upon which an N− epitaxial layer 46 of 25-30 ohm centimeters is formed. The layer 46 forms the collector region for all four transistors. The collector electroding is not shown and is normally applied to the undersurface of the substrate 30. The substrate is square and divided into four equal areas to accommodate each of the four transistors (Q1 to Q4). The areas are defined by the four base regions 31, 32, 33 and 34. The base regions are square P diffusions formed into the upper surface of the wafer. The emitters of each transistor are provided by N diffusions into the respective base diffusions. In particular, the emitter of Q1 is a circular dot 35 diffused into the center of the base diffusion 31. The first emitter of Q2 is a circular dot 36 diffused into the center of the base diffusion 32. The small angular diffusion 37 at the inner corner of 32 is the second emitter of Q2. The emitter of Q3 is the circular dot 38 diffused into the center of the base diffusion 33. The first, and principal current carrying emitter of Q4 is the large L shaped emitter diffusion 39, diffused into the base region 34. The emitter diffusion 39 is large so as to accommodate the larger current requirements of transistor Q4. The second emitter of Q4 is the small rectangular diffusion 40 on the inner corner of the base diffusion 34. In the event that both Q2 and Q4 draw equal amounts of current, the first emitter diffusion of Q2 may be correspondingly enlarged. Surrounding the base region is a narrow guard ring 45, consisting of a P diffusion spaced from, but encircling, the four base regions.

The emitter to base connections are provided by the metallization illustrated in FIG. 5. The metallization is laid down in a single layer and cnsists of four separated parts. The first part 41 interconnects the emitter of Q1 and the base of Q2. The second part 42 interconnects the emitter of Q2, the base of Q3 and the second emitter of Q4. The third metallization 43 interconnects the emitter of Q3 and the base of Q4. The fourth metallization 44 interconnects the emitter of Q4, the base of Q1, and the second emitter of Q2. The metallization 44 is connected by the bonded lead 47 to the control terminal 19 and the metallizaton 42 is connected to the bonded lead 48 to the control terminal 27. The metallization does not contact the guard ring, which floats at an intermediate potential, and permits the transistors to operate at the relatively high voltages indicated.

The foregoing chip is particularly designed to perform the functions outlined in the present application at minimum expense. The addition of a second emitter to the base of the transistors Q2 and Q4 provides a diode function in a particularly efficient manner. It makes efficient use of the available semiconductor area and avoids the need for isolating the diode from the other transistors diffused into the substrate and avoids the need for isolated connections to the diode. The approach permits a high voltage semiconductor process, permitting operation in excess of 200 volts, a feature which is unavailable in conventional IC technology.

A single chip will perform the active functions required for gray scale correction of a single gun, and three such chips will perform active functions for three guns. One may house all three chips in single package, or combine all three functions on a single substrate. The foregoing semiconductor device is readily manufactured using conventional semiconductor processing.

While economics justifies a monolithic construction for the active devices herein described, it shall be evident that discrete devices could also be connected to perform the same amplification functions.

What is claimed as new and desired to be secured by Letters Patent of the United States is:

1. Semiconductor amplification means comprising:
   a. four transistors of like conductivity type wherein
      1. the emitter of the first transistor (Q1) is coupled to the base of the second transistor (Q2),
      2. the transistor Q2 has a first and a second emitter, said first emitter of Q2 being coupled to the base of the third transistor (Q3), and the second emitter of Q2 being coupled to the base of Q1 to insure turn off of Q2 when Q1 is turned off,
      3. the emitter of Q3 is coupled to the base of the fourth transistor (Q4),
      4. the transistor Q4 has a first and a second emitter, said first emitter of Q4 being coupled to the base of Q1, and said second emitter of Q3 being coupled to the base of Q3 to insure turn off of Q4 when Q3 is turned off, and
   b. a first terminal for connection to a d.c. source coupled to the collectors of Q1, Q2, Q3, Q4.

2. Semiconductor amplification means as set forth in claim 1, having in addition thereto
   a pair of control terminals coupled respectively to the base of Q1 and to the base Q3 for causing Q1, Q2 to conduct current from said source to one control terminal and Q3, Q4 to be nonconductive at a low leakage current in response to control signals of one polarity; and for causing Q1, Q2 to be nonconductive at a low leakage current and Q3, Q4 to conduct current from said source to the other control terminal in response to control signals of opposite polarity.

3. Semiconductor amplification means as set forth in claim 1 fabricated in monolithic structure comprising:
   a. a semiconductor substrate having a first region of a first conductivity type forming a common collector region for all four transistors,
   b. four separate diffusions of a complementary conductivity type in said first region forming bases, and
   c. six separate diffusions of said first conductivity type in said base diffusions forming emitters, one emitter diffusion in the base regions of Q1 and Q3 and two emitter diffusions in the base regions of Q2 and Q4.

4. Monolithic semiconductor amplification means as set forth in claim 3 wherein
   said first region is an epitaxial layer on said semiconductor substrate.

5. A monolithic semiconductor amplification means as set forth in claim 4 wherein a four part metallization is provided for said emitter-base interconnections.

6. Monolithic semiconductor amplification means as set forth in claim 5 wherein
   a. a first terminal means is applied to the metallization interconnecting the base of Q1, the second emitter of Q2 and the first emitter of Q4,
   b. a second terminal means is applied to the metallization interconnecting the first emmiter of Q2, the base of Q3 and the second emitter of Q4.

* * * * *